April 11, 1950 H. J. E. WEBER 2,504,060
APPARATUS FOR SEALING CONTAINERS WITH ADHESIVE TAPE
Filed Sept. 12, 1949 5 Sheets-Sheet 1

INVENTOR
Heinrich J. E. Weber
BY
Stevens, Davis, Miller & Mosher
ATTORNEYS

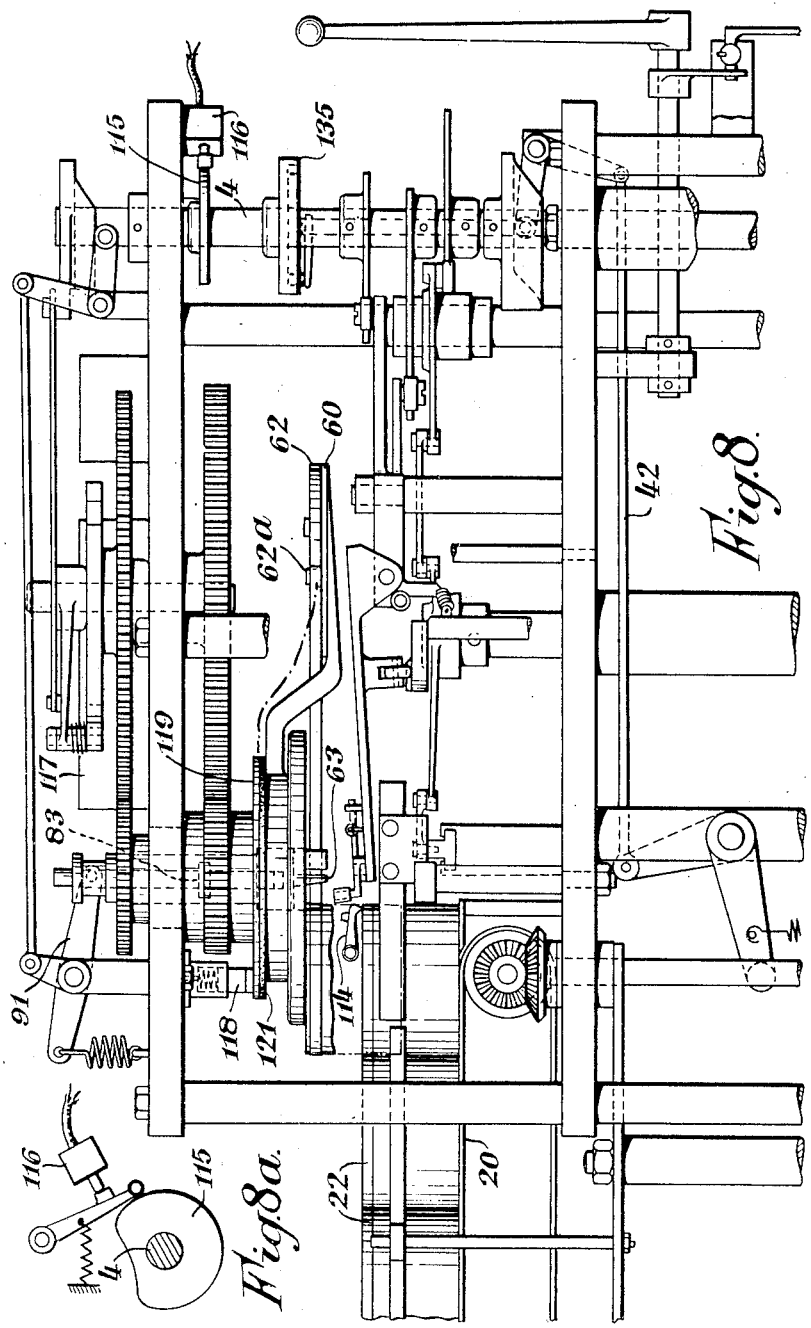

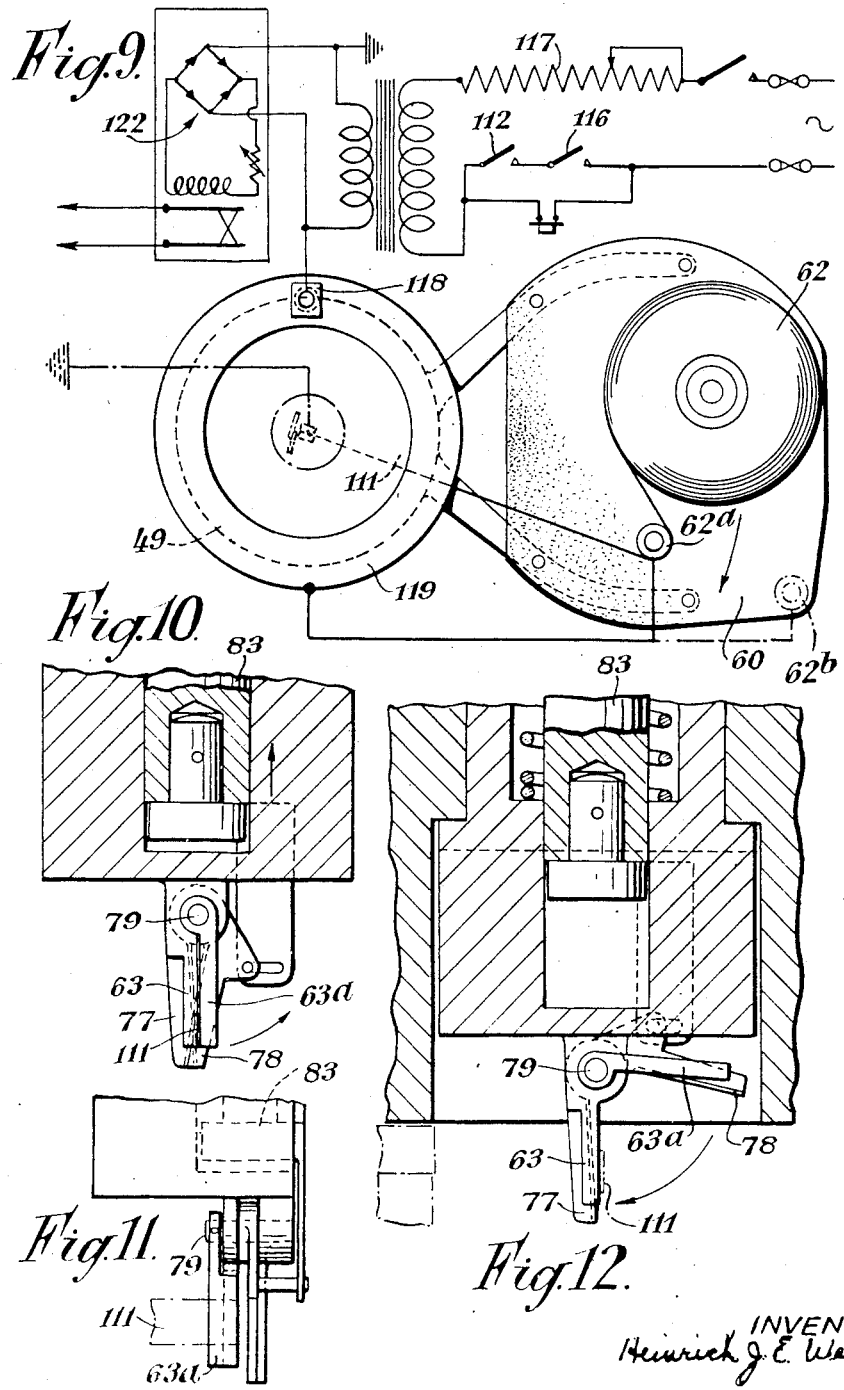

April 11, 1950     H. J. E. WEBER     2,504,060
APPARATUS FOR SEALING CONTAINERS WITH ADHESIVE TAPE
Filed Sept. 12, 1949     5 Sheets-Sheet 4
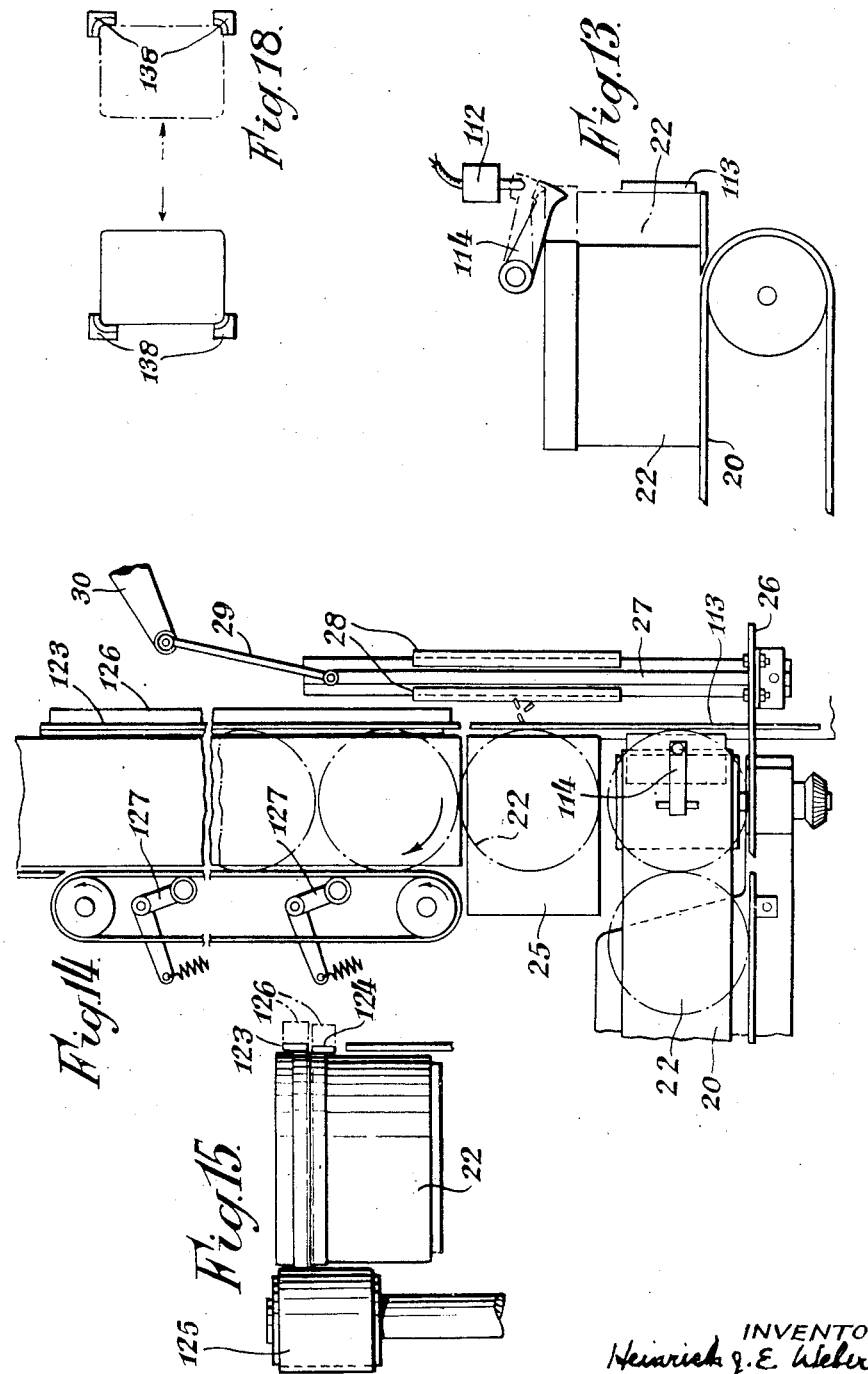
INVENTOR
Heinrich J. E. Weber
BY Stevens, Davis, Miller & Mosher
ATTORNEYS April 11, 1950          H. J. E. WEBER          2,504,060
APPARATUS FOR SEALING CONTAINERS WITH ADHESIVE TAPE
Filed Sept. 12, 1949          5 Sheets-Sheet 5
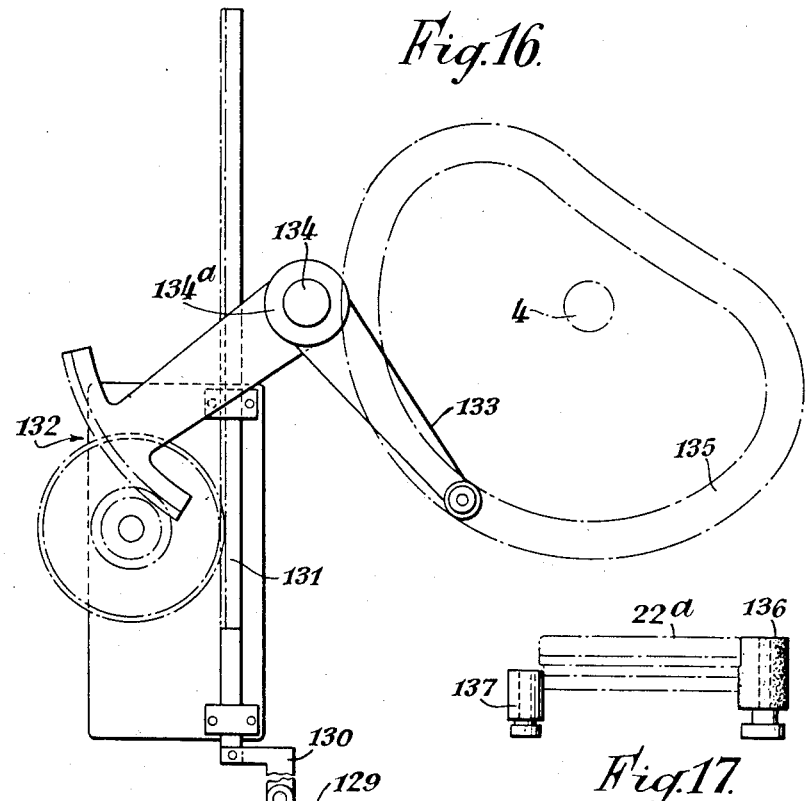
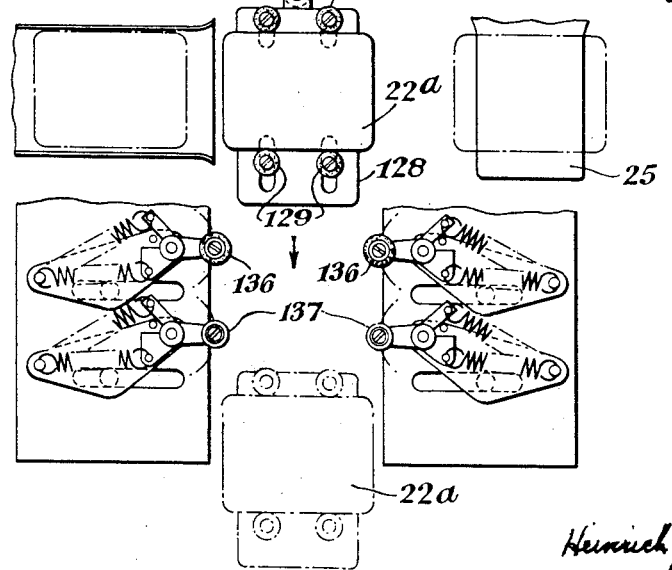
INVENTOR
Heinrich J. E. Weber
BY
Stevens, David Miller & Mosher
ATTORNEYS Patented Apr. 11, 1950

2,504,060

UNITED STATES PATENT OFFICE 2,504,060

APPARATUS FOR SEALING CONTAINERS WITH ADHESIVE TAPE

Heinrich J. E. Weber, Beckenham, England, assignor to Rovego Limited, London, England Application September 12, 1949, Serial No. 115,153
In Great Britain August 4, 1948

11 Claims. (Cl. 216—30)

The present invention is concerned with the sealing of tins or other containers against ingress of air or moisture by means of adhesive tape which is applied in the form of an encircling band overlapping the crevice formed between the container and its associated lid, the edge of the lid overlapping the sides of the container.

The invention is virtually an improvement in or modification of the invention forming the subject of our prior British Patent No. 618,818.

The machine forming the subject of the earlier patent was designed to operate with adhesive tape which consisted of a non-metallic base of a sticky character or was coated with a sticky substance, the tape being pressed by the machine into intimate contact with the tin so that it adhered thereto and sealed the tin.

The machine hitherto proposed included a fixed support for the container to be taped, a tape carrying member adapted to carry a roll of tape and revolvable about the container to apply the tape thereto, a peg or equivalent member for the attachment of the end of the tape prior to the taping operation and means for severing the tape on completion of the taping operation, leaving the end of the tape adhering to the peg for the next succeeding application.

In some cases it is desired to use a metallic tape for sealing purposes such as, for example, one composed of aluminium foil and the chief object of the present invention is to effect certain improvements in or modifications of the existing machine to enable such metallic tape to be efficiently applied to provide efficient sealing of the tin or other container.

According to one feature of the present invention that part of the adhesive coated metallic tape which is to be applied to the tin or other container is heated by the passage of a heating electric current therethrough during application for the purpose of rendering the adhesive coating on the tape tacky or otherwise ensuring good adhesion.

It is proposed to pass a comparatively high amperage current of low voltage through the part of the tape which is to be used immediately, the heating current being drawn from the mains via a suitable transformer. It will be appreciated that the tape will be drawn from a roll and that the adhesive coating will not adhere to the container when cold, the adhesive being, for example, an adhesive of the thermoplastic type, the adhesive solidifying on cooling.

It is preferred to apply the heating current to the tape by means of a roller with which the tape contacts, the opposite end of the section of tape to be heated being earthed through the machine by way of a peg or equivalent member to which the end of the tape is attached. It is preferred that a gripper is associated with the peg, the tape being gripped at its extremity between the gripper and peg, thereby preventing the tape falling off the peg prior to the taping operation.

In order that the invention may be clearly understood and readily carried into effect the invention is hereinafter described with reference to the accompanying drawings in which:

Figure 8 is a part side elevation of the machine;

Figure 8a illustrates a cam operated switch for controlling the duration of the heating current;

Figure 9 is a view of certain parts of the machine and the theoretical electric circuit;

Figures 10, 11 and 12 illustrate the construction of the grippers for gripping the extremity of the tape;

Figure 13 is a view illustrating a container operated switch and its method of operation;

Figure 14 is a fragmentary plan view of the machine showing the supplementary heating means;

Figure 15 is a part sectional view thereof drawn on an enlarged scale;

Figure 16 is a plan view showing mechanism provided for increasing adhesion of the tape to a container of rectangular form;

Figure 17 is a view illustrating the use of additional rollers for improving adhesion of the tape;

Figure 18 illustrates diagrammatically a small modification.

Figure 1:
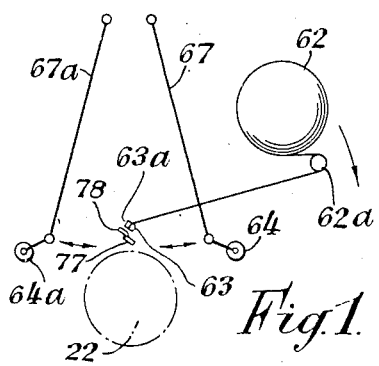
Figures 1 to 6 illustrate diagrammatically the manner in which the tape is progressively applied to a container.
Figure 2:
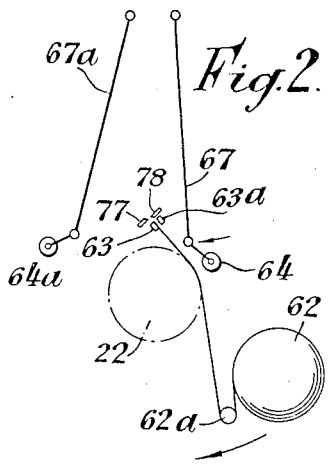

The invention will now be described in detail as applied to the particular construction of taping machine forming the subject of our prior Patent No. 618,818. The machine in question has been designed to tape a number of containers in quick succession and without interruption until the tape drawn from a supply roll has been exhausted, the process of taping a container involving the following operations:

(1) Moving container to be taped into position for taping and clamping container in taping position to prevent container turning about its axis during the taping operation;

(2) Taping container;

(3) Severing tape including rolling projecting end of tape into overlapping relationship with the end of tape previously applied to container;

(4) Releasing clamping force on container;

(5) Moving taped container out of taping position to make way for fresh container to be taped.

As the present invention is only to a minor extent concerned with the operation of the particular machine forming the subject of prior British Patent No. 618,818, it is proposed to describe the construction and operation of the machine only so far as is necessary to enable the invention to be readily understood and carried into practice.

Although in the ensuing description and accompanying drawings the machine is shown mainly in the process of taping containers of circular formation it will readily be understood that the machine is in no way confined to the taping of circular containers, but is applicable for use generally with containers of other shapes, for example, containers of rectangular formation having square or rounded corners.

Referring in the first case to Figures 1 to 7 which illustrate diagrammatically the general operation of the main parts of the machine with which the present invention is concerned, it will be seen from Figures 1 to 6 that the container to be taped occupies a stationary position and the roll of tape is passed around the stationary container so that the tape drawn from the roll is laid in position on the container in a position in which it seals the crevice between the container and its associated lid. In this connection reference numeral 62 indicates the roll of tape, 22 the container, 63 and 63a the component parts of a gripping device which grips the extremity of the tape drawn from the roll, 77 and 78 the co-operating blades of a scissor-like tape severing device, whilst reference numerals 64 and 64a indicate rollers mounted on pivoted arms 67 and 67a, which arms are given a pivotal motion by cam mechanism to bring their associated rollers into operative engagement with the tape during and after its application to the container for the purpose of ensuring adhesion of the extremity of the tape to the container and good overlapping relationship of the opposite end of the tape and in fact obtaining an efficient seal where the two ends of the tape overlap.

Figure 3:
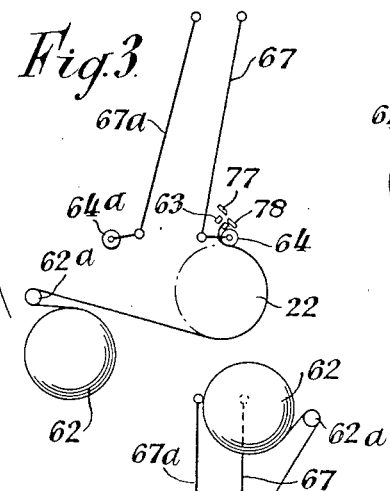
Figure 4:
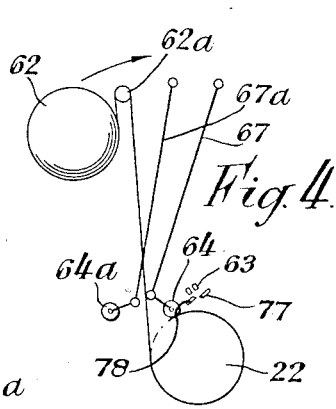

The general operation of this mechanism will be clearly seen from Figures 1 to 7. In Figure 1 a container has arrived at the taping position and in Figure 2 the roll of tape has started its circular motion about the container, thus laying the tape in position on the container. In Figure 3 further movement of the roll of tape has taken place and roller 64 has advanced to detach the extremity of the tape from the grippers which have been opened automatically to release the tape, the roller passing over the extremity of the tape into the position shown in Figure 4 to ensure efficient adhesion of the extremity of the tape to the container.

Figure 5:
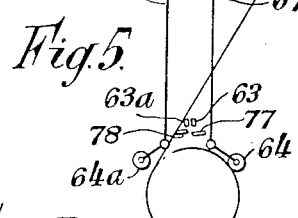

In Figure 5 the roll of tape has almost completed its path of movement and the tape is in process of being severed.

Figure 6:
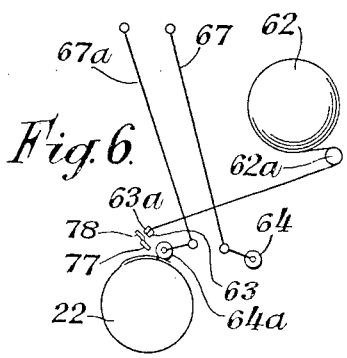

In Figure 6 the roll of tape has returned to its initial position, the grippers being once more opened to again grip the extremity of the tape and roller 64a has advanced to roll the end of the tape into firm overlapping relationship with the opposite end of the tape previously affixed to the container.

Figure 7:
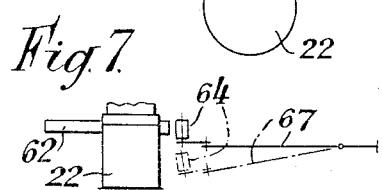
Figure 7 is a further diagram illustrating a detail of construction.

As it is necessary for the tape to pass rollers 64 and 64a at points in the path of movement of the tape roll, it is necessary for the rollers 64 and 64a to be moved downwardly at appropriate times and in Figure 7 the downward movement of the lever 67 is indicated by dotted lines.

The machine includes a fixed centre head 49 and a platform 25 on to which the containers are moved one by one the platform being then raised so that the container during taping is gripped between the platform and the under surface of the fixed head 49. Movement of the containers 22 from the endless belt 20 on to platform 25 is effected by means of a pusher 26 attached to slide 27 slidably mounted within guides 28, slide 27 being connected by means of a connecting rod 29 with a lever 30 which is cam actuated to impart the necessary movement to each container 22.

The roll 62 of adhesive coated metal tape is mounted on a platform or plate 60 which is revolvable about the centre of the fixed head 49 so that the tape is laid in the appropriate position on the container to seal the crevice between the walls of the container and its associated lid. The general form of the platform or plate is shown in Figures 8 and 9, the coiled tape being shown in position and passing over a metal roller 62a which for a purpose hereinafter referred to is capable of having its position adjusted, for example, into the position indicated by dotted lines and bearing a reference 62b. The plate or platform 60 is preferably of insulating material as it is intended that the roller 62a shall be utilised for the supply of electric heating current to that part of the tape which is to pass around the container.

The general arrangement of the grippers and scissors for the purpose respectively of gripping the end of the tape as drawn from the roll and severing the tape on the completion of the taping operation is shown in Figures 10 to 12, the grippers and scissors being opened and closed automatically at the appropriate times by means of suitable cam mechanism which forms no part of the present invention.

The general operation of the machine as it affects the carrying out of the present invention having been generally described, the electrical mechanism for heating the tape and rendering the adhesive coating tacky or otherwise ensuring good adhesion of the tape to the containers will now be hereinafter described in detail.

It will be appreciated that heating of the tape is only momentary and in fact it is essential that only that part of the tape which is to encompass the container is heated and with this object in view it is proposed to heat the appropriate part of the tape by a high amperage current of low voltage drawn from a transformer indicated diagrammatically in Figure 9, the primary winding of the transformer being connected by way of a variable resistance 117 and a series of micro switches of which only two are illustrated which bear reference numerals 112 and 116 and which are provided for a purpose hereinafter referred to.

A differential voltage relay is associated with the transformer's secondary winding, the relay being generally indicated by reference numeral 122, the relay being provided for the purpose of breaking the electrical circuit of the driving motor operating the machine in the event of the tape breaking or a bad contact occurring, the relay being sensitive to excessive voltage in the low voltage secondary winding of the transformer.

As will be seen clearly from Figure 9 a high amperage current of low voltage will be conducted to the roller 62a by way of a brush 118 making contact with a contact ring 119 which is revolvable with the plate or platform 60. The heating current can be regulated to suit the particular tape used and the length of tape which is to be heated by means of the variable resistance 117. For example, a container of larger diameter than normally would require the passage of a higher heating current as an increased length of tape would be required and in order that the appropriate length of tape shall be heated to suit a particular diameter of container, the position of the roller 62a is adjustable, or alternatively, a number of such rollers may be arranged on the plate 60 suitably spaced apart to suit containers of different diameters, the rollers being wired in parallel. A lead 120 is taken from the roller or rollers to the slip ring 119 and a suitable lead is taken from the brush 118 to the secondary winding of the transformer.

Assuming that a container has been moved by means of the endless belt 20 and pusher 26 on to the platform 25 and the latter has been raised so that a container is gripped between the platform and the fixed head 49, the electrical heating circuit will be completed to pass a heating current through that part of the tape which is to be applied to the container and to prevent premature heating of the tape before the container reaches the taping position a switch 112 is provided in the heater circuit (see Figure 13) which is closed by means of a lever 114 which is raised by the edge of the container 22 when the latter is moved into engagement with a wall or stop member 113 of the conveyor 20, thereby completing the electrical heating circuit.

The end of the tape which is drawn from the roll 62 will already have been gripped between the peg 63 and gripper member 63a, i. e., the gripper will be in the closed position indicated in Figures 10 and 11. In this connection it will be appreciated that the electric heating current will be passed through the tape and into the gripper which is earthed to the machine. As a comparatively heavy current of low voltage is passed through the tape it is desirable that the electrical heating circuit should be broken prior to the tape being severed and consequently duration of heating is determined by means of a cam 115 (see Figures 8 and 8a) which cam is carried by the main driven shaft 4 of the machine and actuates a switch 116 in the heater circuit through the medium of a spring urged lever shown clearly in Figure 8a. In this way switch 116 will open to break the electrical heating circuit just before the parts assume the position indicated in Figure 6, that is to say, before the scissor-like severing device 77 is brought into operation to cut the tape and the gripper is again closed on to the extremity of the tape ready for the next cycle of operation.

Figure 9 as previously mentioned shows two switches 112 and 116 and it is proposed to employ a number of such switches on the machine for the purpose of preventing the machine's operation in the event of a breakage of the tape occurring, or alternatively from being a bad contact which will adversely affect the heating of the tape, or in the event of, for example, a machine cover or cowling not having been placed in position. As previously explained the differential voltage relay is sensitive to the voltage of the low voltage secondary winding and in this way the relay can be arranged to open circuit the no-volt coil of the motor starter.

In order to ensure a perfect seal between the container and its associated lid by getting rid of any air pockets which may have been formed beneath the tape in the initial taping operation and to ensure that the tape adheres to the container all round its circumference, the tape after application is pressed firmly onto the container whilst being reheated. This is effected in the manner shown in Figure 15, the containers after leaving the table 25 passing between the guides 123 and 124 on the one side and a flexible band 125 on the other side. The flexible band is suitably driven to expel the containers from the machine and to press the taped parts of each container against the guides 123 and 124 which are suitably heated, the container being rotated axially and traversed lengthwise of the guides by the endless band. In this way the applied tape is not only reheated but pressed firmly onto the lid and adjacent part of the container and as will be seen clearly from Figure 15 guides 123 and 124 are not in the same vertical plane but are so arranged that the one guide, i. e., the upper guide 123 presses against the tape on the lid of the container whilst the other guide 124 engages the tape on the body of the container which is slightly out of the plane of the tape on the lid. The guides 123 and 124 are preferably heated by heating elements 126. Tension devices 127 may be provided operating on the flexible band for ensuring good contact between the containers and components 123 and 124. It will be appreciated that the conveyor delivery means and the like can all be made adjustable to accommodate various sizes of containers.

Although the machine so far described and illustrated has made reference to the taping of containers of circular form in many cases it will be desired to tape containers of other shape, for example, rectangular form and with the object of obtaining perfect sealing it is proposed to incorporate certain modifications which are shown in Figures 16 and 17.

In this connection it will be appreciated that in the case of a container of rectangular form any difficulty in obtaining a good seal will be experienced where the tape passes around the corners of the container.

Referring now to Figure 16 in which the containers are indicated by reference numeral 22a, the container after leaving the table 25 is pushed onto a platform 128 between resilient rollers 129 and held in that position. At this stage the platform 128 with a container in position thereon is given a transverse movement by means of an arm 130 secured to a rack 131 actuated by gearing 132 controlled by a cam follower 133 secured to the upper end of a shaft 134 secured in a roller 134a. This cam follower 133 is controlled by a cam 135 secured to the main shaft 4 of the machine.

The platform 128 and its associated container will be moved from the full line position to the dotted line position and back again and during its forward movement the leading corners of the container will come into engagement with spring urged pivotally mounted resilient rollers 136 which will serve to wipe the leading corners and ensure initimate contact of the tape with both the lid and container walls. Further movement in a forward direction results in the leading corners of the container coming into contact with heated metal rollers 137 which further ensure perfect sealing between the lid and the container. On the return movement of the platform 128 and its associated container the hitherto trailing corners of the container will be similarly treated.

Figure 17 illustrates in side elevation the manner in which rollers 136 and 137 engage the tape and ensure good adhesion of the tape to the lid and the walls of the container.

Referring now finally to Figure 18, this shows an alternative arrangement in which the container is moved transversely into engagement with form pieces 138 which are shaped to conform with the shape of the corners and which take the place of the rollers illustrated in Figure 16, the form pieces being, if necessary, heated to facilitate adhesion of the tape to the container.

Although it is preferred to employ an adhesive of the thermo-plastic type, i. e., one which will solidify on cooling, it is within the scope of the invention to utilise any other suitable adhesive, for example, a synthetic resin adhesive of the thermo-setting type which will set with a minimum of heat and pressure.

What I claim is:

1. Apparatus for sealing containers with adhesive coated metal tape drawn from a roll comprising means for feeding said containers in succession to a predetermined taping position means for progressively applying tape around each container when in its taping position means for passing an electrical heating current through that part of the tape drawn from the roll which is to be applied to the container and during the tape's application means for severing the required length of tape from the roll switching means for breaking the electrical heating circuit at the appropriate time and means for pressing the tape firmly into contact with the container.

2. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container means for passing an electrical heating current through that part of the tape drawn from the roll which is to be applied to the container and during the tape's application means for severing the required length of tape from the roll switching means for breaking the electrical heating circuit just prior to severing the tape and means for pressing the tape firmly into contact with the container.

3. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container means for passing an electrical heating current through that part of the tape drawn from the roll which is to be applied to the container and during the tape's application means for severing the required length of tape from the roll switching means for completing the electrical heating circuit on the container reaching the taping position and for breaking the circuit just prior to severing of the tape and means for pressing the tape firmly into contact with the container.

4. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container means for severing the tape which has been applied to the container from the rest of the roll switching means for completing the electrical heating circuit on the container reaching the taping position and for breaking the circuit just prior to severing of the tape and means for pressing the tape firmly into contact with the container.

5. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container means for severing the tape which has been applied to the container from the rest of the roll switching means for completing the electrical heating circuit on the container reaching the taping position and for breaking the circuit just prior to severing of the tape and rollers movable into operative engagement with the container and applied tape to press the latter firmly in position.

6. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container means for severing the tape which has been applied to the container from the rest of the roll rollers movable into operative engagement with the container and applied tape to press the latter firmly in position and means for heating the container and applied tape by conduction heating subsequent to application of the tape.

7. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container means for severing the tape which has been applied to the container from the rest of the roll switching means for completing the electrical heating circuit on the container reaching the taping position and for breaking the circuit just prior to severing of the tape rollers movable into operative engagement with the container and applied tape to press the latter firmly in position and switching means for breaking the electrical circuit controlling operation of the machine automatically in the event of the tape breaking during application.

8. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container means for severing the tape which has been applied to the container from the rest of the roll switching means for completing the electrical heating circuit on the container reaching the taping position and for breaking the circuit just prior to severing of the tape rollers movable into operative engagement with the container and applied tape to press the latter firmly in position switching means for breaking the electrical circuit controlling operation of the machine automatically in the event of the tape breaking during application and a cam operated switch controlling the length of time over which the tape is subjected to the action of the heating electric current the speed of rotation of the cam being in proportion to the speed of operation of the machine.

9. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container the position of said roller being adjustable to vary the length of the tape through which the heating electric current is passed means for severing the tape which has been applied to the container from the rest of the roll switching means for completing the electrical heating circuit on the container reaching the taping position and for breaking the circuit just prior to severing of the tape rollers movable into operative engagement with the container and applied tape to press the latter firmly in position and switching means for breaking the electrical circuit controlling operation of the machine automatically in the event of the tape breaking during application or in the event of a faulty connection being made thereby stopping the machine.

10. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw tape from the roll and lay the tape in position around said container a roller in permanent contact with the metal surface of the tape as it is drawn from the roll for the supply of an electrical heating current to that part of the tape which is to encompass the container the position of said roller being adjustable to vary the length of the tape through which the heating electric current is passed a transformer having a low voltage secondary winding connected with said roller for supplying heating current means for severing the tape which has been applied to the container from the rest of the roll switching means for completing the electrical heating circuit on the container reaching the taping position and for breaking the circuit just prior to severing of the tape rollers movable into operative engagement with the container and applied tape to press the latter firmly in position and switching means for breaking the electrical circuit controlling operation of the machine automatically in the event of the tape breaking during application or in the event of a faulty connection being made thereby stopping the machine.

11. Apparatus for sealing containers with adhesive coated metal tape drawn from a roll comprising means for feeding said containers in succession to a predetermined taping position a movable platform for supporting the roll of tape gripping means for gripping the extremity of the tape drawn from the roll means for moving said platform and roll of tape around the container when in its taping position to draw the tape from the roll and lay the tape in position around said container a roller in permanent contact with the metal surface of the tape as it is drawn from the roll for the supply of an electrical heating current to that part of the tape which is to encompass the container the position of said roller being adjustable to vary the length of the tape through which the heating electric current is passed a transformer having a low voltage secondary winding connected with said roller for supplying heating current a differential voltage relay sensitive to excessive voltage in the low voltage secondary winding of the transformer for breaking the electrical circuit of the driving motor operating the machine in the event of the tape breaking or a bad contact occurring means for severing the tape which has been applied to the container from the rest of the roll switching means for completing the electrical heating circuit on the container reaching the taping position and for breaking the circuit just prior to severing of the tape and rollers movable into operative engagement with the container and applied tape to press the latter firmly in position.

HEINRICH J. E. WEBER.

No references cited.